A. R. WYLIE & J. G. WRIGHT.
VEHICLE WHEEL.
APPLICATION FILED SEPT. 27, 1910.

1,026,291.

Patented May 14, 1912.

WITNESSES:

INVENTORS
Alfred R. Wylie.
James G. Wright.
BY
ATTORNEYS

UNITED STATES PATENT OFFICE.

ALFRED R. WYLIE AND JAMES G. WRIGHT, OF BIG SPRING, TEXAS.

VEHICLE-WHEEL.

1,026,291.  Specification of Letters Patent.  Patented May 14, 1912.

Application filed September 27, 1910. Serial No. 584,032.

*To all whom it may concern:*

Be it known that we, ALFRED R. WYLIE and JAMES G. WRIGHT, citizens of the United States, residing at Big Spring, in the county of Howard and State of Texas, have invented certain new and useful Improvements in Vehicle-Wheels, of which the following is a specification.

Our invention relates to new and useful improvements in vehicle wheels, and relates more particularly to certain improvements upon the invention for which Letters Patent were applied for by us under Serial Number 565,587, on June 7th, 1910.

The object of the invention is to provide a vehicle wheel equipped with a substitute for the pneumatic tire, that will be of a cheaper and more lasting construction than such a tire.

A further object is to provide a vehicle wheel having an inner and an outer hub (the latter being rigid with the spokes and rim), spaced from each other and adapted to undergo relative motion, coiled springs being mounted radially upon the outer hub which serve to communicate rotation from one hub to the other.

A still further object is to provide resilient means for communicating rotation from one hub to the other, or for communicating a tangential shock from one hub to the other.

Finally, the object of the invention is to provide a device of the character described that will be strong, durable and efficient and comparatively easy to construct, and one the various parts of which will not be likely to get out of working order.

Figure 1:
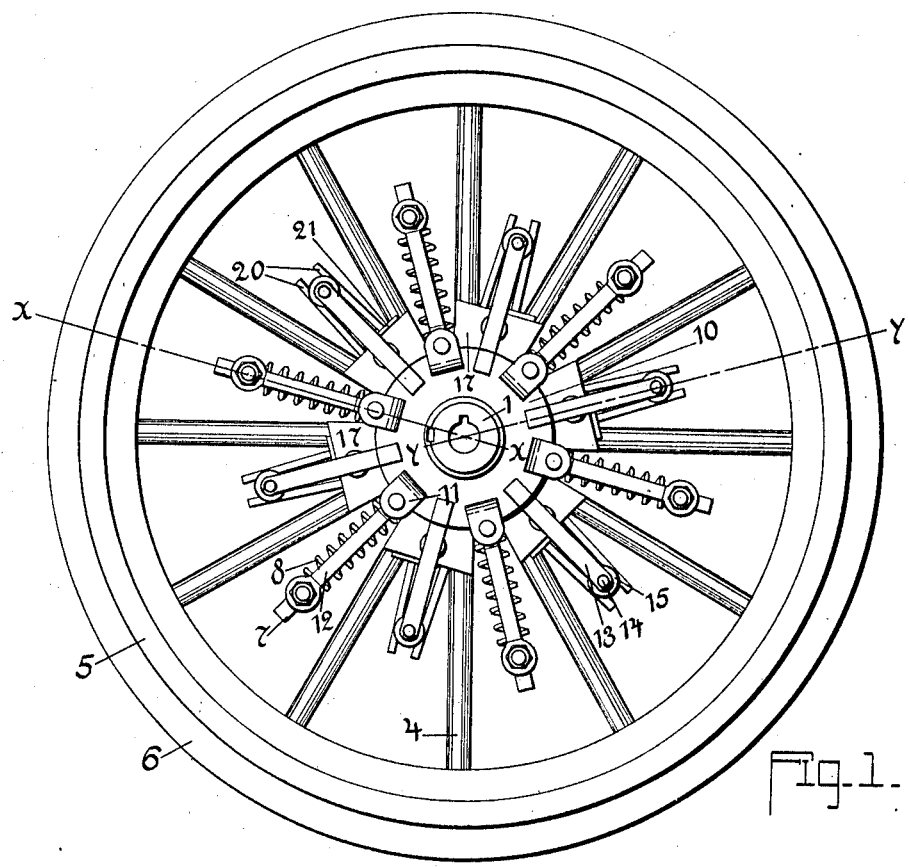
Figure 2:
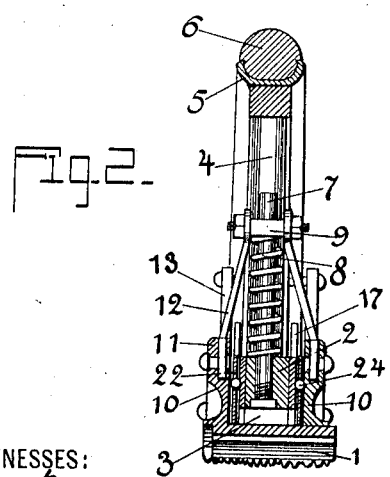
Figure 3:
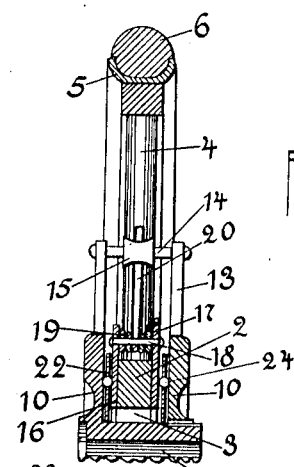
Figure 4:
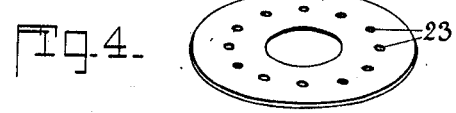

With these and various other objects in view, our invention has relation to certain novel features of construction and operation, an example of which is described in the following specifications and illustrated in the accompanying drawing, wherein:

Figure 1 is a side elevation of the vehicle wheel complete. Fig. 2 is a transverse sectional view taken on the line $x$—$x$ of Fig. 1 showing half the wheel, including one of the radial coiled springs which establish a resilient connection between the inner and the outer hub and serve to deaden the force or energy with which a shock is received by the rim and communicated to the inner hub of the wheel. Fig. 3 is a transverse sectional view taken on the line $y$—$y$ of Fig. 1 showing half the wheel including one of the horizontal coiled springs which serve to establish communication of rotation between the two hubs and to reduce the force with which tangential shocks are communicated from one hub to the other. Fig. 4 is a perspective detail view showing an apertured circular plate which forms a retainer for ball bearings employed to lessen the friction produced by relative motion between the two hubs.

Referring now more particularly to the drawing wherein like numerals of reference designate similar parts in all the figures, the numeral 1 denotes the inner hub of the wheel which is adapted to receive the axle of a vehicle, and more particularly of an automobile.

The numeral 2 denotes the outer hub which is separated from the inner hub by a space 3, and which forms part of a rigid frame including the spokes 4 and the rim 5. The rim 5 is shown provided with a solid rubber tire 6 which will probably be most efficient when the wheel is employed upon an automobile. For some purposes a steel tire might be substituted to good advantage for the rubber tire here shown. A plurality of rods 7 are radially mounted in the outer hub 2 between the spokes of the wheel. Each of these rods carries a coiled spring 8 the inner extremity of which bears against the outer hub 2. On each of the rods 7 there is also mounted a sliding collar 9 contiguous with the outer extremity of the spring coiled on the rod.

At each side of the inner hub 1 there is rigidly mounted a circular plate 10, one of these plates being preferably made integral with said hub. Each of these plates is provided near its rim with a plurality of radial sockets 11, the sockets on each plate being equal in number to the rods 7. In each socket there is pivotally mounted the inner extremity of a radial arm 12, the outer extremity of said arm being pivotally attached to one of the collars 9. Each of the plates 10 is provided with an equal number of arms 13, the arms on the two plates being oppositely disposed. Upon the outer extremity of each pair of arms there is mounted a spindle 14 carrying a roller 15.

At each side of the outer hub 2 a circular plate 16 is mounted rigid. Each of these plates is provided with an equal number of lugs 17, which are oppositely disposed upon the two plates. Each pair of opposite lugs carries a spindle 18, and each spindle 18 carries a pair of coiled springs 19. One extremity 20 of each spring 19 bears against one of the rollers 15 at opposite sides of said roller. The other extremity 21 of each spring 19 rests upon the outer edge of one of the lugs 17. Between each of the adjacent plates 10 and 16 there is mounted upon the hub 1 a thin circular plate 22 provided with a plurality of apertures 23 arranged in a circle. Each of the apertures 23 receives a ball bearing 24.

In the operation of this vehicle wheel when any shock is imparted to the rim of the wheel through contact with an obstacle during rotation, or due to the inequalities in a road, there will result a displacement of the frame which includes the rim, spokes and outer hub in a direction approximately vertical. Owing to this displacement, such of the springs 8 as are upon the upper portion of the wheel at the time of the shock will be compressed, and the collars 9 upon the rods which carry said springs will be slightly displaced, this displacement being communicated to the inner hub 1 through the radial arms 12. The springs upon the lower portion of the wheel will not be effected by the shock. The springs at the sides of the wheel will undergo a slight compression, the relative motion between the two hubs being compensated for by a pivotal turning of the arms 12.

The purpose of the springs 16 is to provide suitable means for establishing communication of rotation between the inner and outer hubs and for taking up or reducing tangential shocks imparted to the outer hub or to the frame of which it forms a rigid part.

A rotation of the hub 2 in either direction will tend to produce an expansion of one of the springs 19 upon each spindle 18. Similarly a displacement or contortion of the springs 19 will result when rotation is communicated from the inner hub to the outer hub as on the driving axle of an automobile. When a relative displacement takes part between the inner and outer hubs, a certain amount of friction will occur, which it is desirable to reduce to a minimum. For this reason, the ball retainers 23 and ball bearings 24 are interposed between the inner hub and the plates 10.

The above described wheel is superior to wheels employing pneumatic tires both in economy and durability, and also in the quality of service given, since the pneumatic tire requires frequent repairs such as will not be necessary with the above described wheel.

What we claim is:

1. The combination in a vehicle wheel of inner and outer spaced hubs, spokes rigid with the outer hub, a rim rigid with the spokes, a plurality of arms projecting radially from the inner hub, rods extending from the outer hub, collars carried by the arms and embracing the rods, coil springs surrounding the rods and engaging the hub and the collars, arms projecting from the inner hub, rollers pivoted between these arms, coil springs carried by the outer hub, extensions formed upon the springs and engaging the rollers, and antifriction rings interposed between the hubs.

2. The combination in a vehicle wheel of inner and outer spaced hubs, spokes rigid with the outer hub, a rim rigid with the spokes, a plurality of arms projecting radially from the inner hub, rods extending from the outer hub, collars carried by the arms, said rods slidable in said collars, coil springs surrounding the rods and engaging the hub and the collars, arms projecting from the inner hub, rollers mounted between said arms, plates secured to each side of said outer hub, lugs extending therefrom, spindles mounted between said lugs, a pair of coiled springs carried by each spindle, one extremity of each spring bearing against the opposite sides of said rollers and the other extremity resting upon the outer edge of said lugs, substantially as described.

In testimony whereof we have signed our names to this specification in the presence of two subscribing witnesses.

ALFRED R. WYLIE.
JAMES G. WRIGHT.

Witnesses:
S. H. MORRISON,
W. T. BALLARD.

Copies of this patent may be obtained for five cents each, by addressing the "Commissioner of Patents, Washington, D. C."